April 4, 1967
E. MAX
3,312,519
WIDE RANGE HIGH SPEED ADJUSTABLE FOCUSING OF HIGH FREQUENCY
ELECTROMAGNETIC RADIATION
Filed June 28, 1963
2 Sheets-Sheet 1
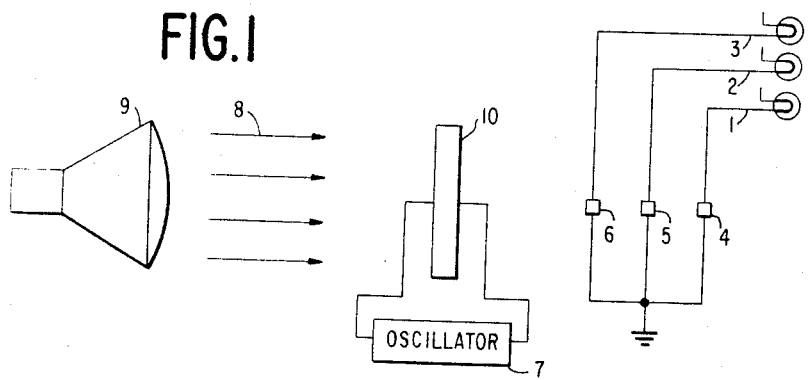
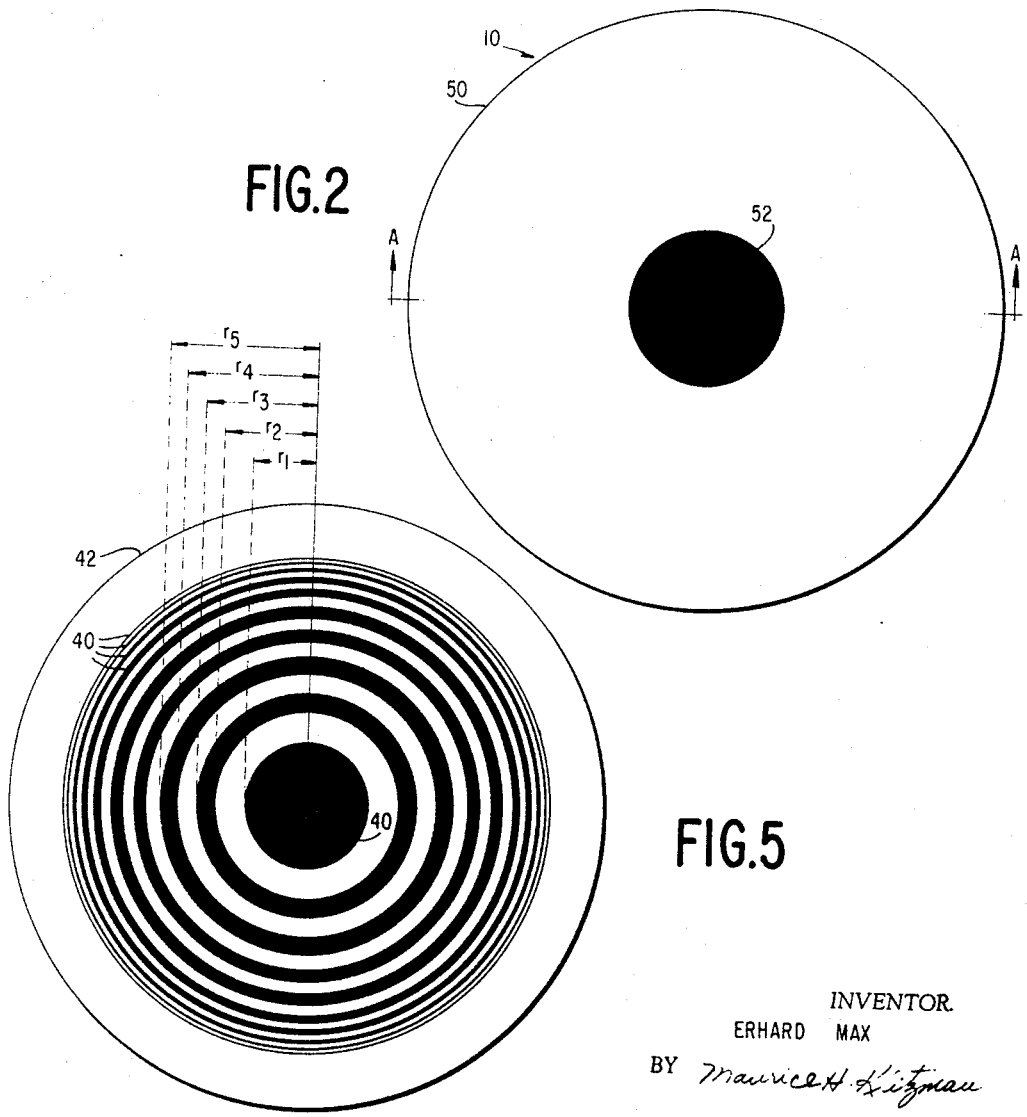
INVENTOR.
ERHARD MAX
BY Maurice H. Litzman
ATTORNEY April 4, 1967   E. MAX   3,312,519
WIDE RANGE HIGH SPEED ADJUSTABLE FOCUSING OF HIGH FREQUENCY
ELECTROMAGNETIC RADIATION
Filed June 28, 1963   2 Sheets-Sheet 2

United States Patent Office

3,312,519
Patented Apr. 4, 1967

3,312,519
WIDE RANGE HIGH SPEED ADJUSTABLE FOCUSING OF HIGH FREQUENCY ELECTROMAGNETIC RADIATION
Erhard Max, Wappingers Falls, N.Y., assignor to International Business Machines Corporation, New York, N.Y., a corporation of New York
Filed June 28, 1963, Ser. No. 291,515
14 Claims. (Cl. 350—161)

This invention is related to the controlling and the directing of electromagnetic radiation. In particular this invention is related to the focusing of electromagnetic radiation of high frequency to selectable, widely spaced points at high speed using an economical structure.

Light in other high frequency electromagnetic radiation has many useful and beneficial properties which can be employed to great advantage. One of the beneficial properties of this type of radiation is the speed of travel, which is the greatest signal speed known in nature. High frequency electromagnetic radiation can be generated quickly, inexpensively, and conveniently. It can be detected with structurally simple equipment. High frequency electromagnetic radiation, unlike lower frequency electromagnetic radiation, does not diffract around large objects. High frequency electromagnetic radiation therefore can be transferred with a minimum of losses in the transmission path and with a minimum of interference to nearby equipment.

In the utilization of light and other high frequency electromagnetic radiation it is often necessary to focus such radiation to a point. Furthermore, it is often necessary to selectively focus such radiation to different points and to selectively focus with a minimum of time delay. The prior art has recognized that it would be desirable to have a wide range high speed adjustable device which could be useful in any application. However, the prior art does not include satisfactory techniques to change the point of focus over such a wide range and with such high speed that logic can be performed with low cost optical devices or other high speed focusing applications can be employed. In the prior art, selective focusing of high frequency electromagnetic radiation is generally obtained by the mechanical moving of parts in the focusing system. Mechanical adjustment of this kind is slow. Furthermore, electrical systems which require delicate fabrication to properly locate electrodes on a carefully dimensioned surface have many economic disadvantages. Fabrication of such structures, especially in large numbers, can be expensive, and they often require large electrical power supplies. The prior art does not include a satisfactory system to selectively focus by utilizing a high speed and economical system.

It is therefore an object of this invention to improve significantly over known focusing systems by providing a lens which can be focused a high speeds and which can be fabricated more economically.

It is a further object of this invention to improve significantly over mechanical focusing systems by providing a lens which can be focused at high speeds by merely changing an electrical input.

It is another object of this invention to provide a high speed adjustable lens which can be focused to more widely separated points.

It is a still further object of this invention to provide a cheaper, high speed adjustable lens.

It is still another object of this invention to provide an electrically adjustable lens which does not require a large electrical power source.

It is another, still further object of this invention to create a practical and low cost lens which can be focused to different points with high speed.

In accordance with one aspect of the invention a plate is provided of stress-optic substance which changes the status of polarization of the radiation passing through the substance when the substance is under stress. The plate is designed with reference to the speed of travel of a stress wave in the plate and also with reference to the boundaries of the plate and the location where mechanical vibrations are to be impressed on the plate so that standing waves are induced by the mechanical vibrations at points which define a Fresnel zone plate. When monochromatic, collimated electromagnetic radiation of high frequency is directed perpendicular to the so defined Fresnel zone plate so as to intercept the pattern, which diffracts radiation to a point, the status of polarization of radiation will change as it passes through those stressed locations at which the stress-optic effect has been induced by the standing waves. Fresnel focusing occurs because the emerging radiation has polarity components which are orthogonal and therefore do not interfere with the unchanged radiation. By selectively adjusting the frequency of the mechanical vibrations, the positions of the stress-optic effect locations induced in the plate are changed in accordance with the principles of the Fresnel zone plate so as to vary the point of focus of the lens.

In accordance with a more specific aspect of the invention, the plate used is composed of a moldable stress-optic material such as Plexiglas or a plastic which is stress-optic with at least one side formed as a concave parabola so that the boundaries of the plate cause standing waves which can be manipulated and located in a desired manner.

The foregoing and other objects, features, and advantages of the invention will be apparent from the following more particular description of the preferred embodiment of the invention, as illustrated in the accompanying drawings.

FIG. 1 illustrates the invention employed in a logic system.

FIG. 2 shows the lens structure of the invention as it is viewed from the source of light.

FIG. 3 also shows the entire optical system in greater detail.

FIG. 5 is a Fresnel zone plate of the conventional type, included to make clear the general configuration which the invention creates and varies with the combination of electrical and vibratory means.

Figure 3:
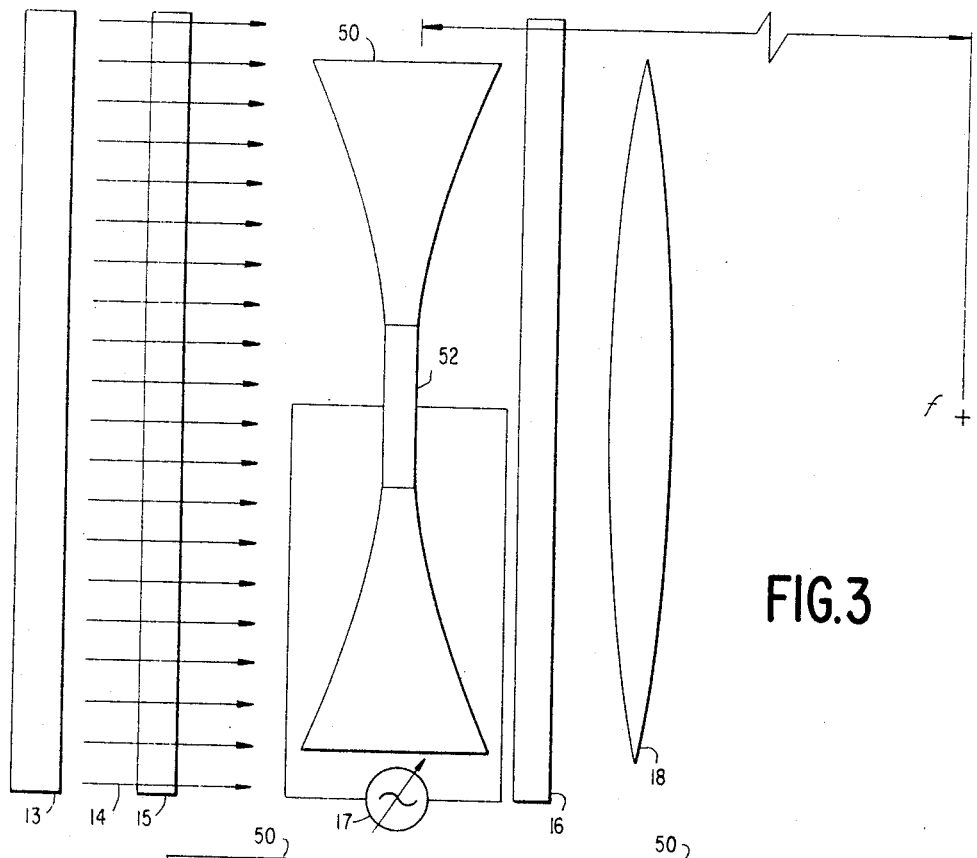
FIG. 3 shows a cross section through the lens at its center thus illustrating both the structure of the lens and the manner in which light is focused to differing points.

In order to illustrate the invention used in one way to full advantage, reference is made to FIG. 1. The system is a logical device with three possible outputs 1, 2, and 3 activated by photodiodes 4, 5, and 6. The input is the oscillator 7, which could be a frequency which will be described digitally by the outputs 1, 2, and 3. The light beam 8 from source 9 constantly impinges upon the adjustable lens 10, which is the adjustable lens of this invention.

The oscillator 7 is always at the frequency being observed. In response to this frequency, the lens 10 causes focusing of the light beam 8 at different points. Thus, focusing on diode 4 causes an output on line 1 which is a digitized indication of the frequency being observed. Focusing on, for example, diode 6 is a different digitized signal indicative of a different frequency.

Reference is made to FIG. 2, which illustrates the very simple and economical structure of this invention. It is clear from FIG. 2 that only one element is used in combination with the plate 50 to create the Fresnel zone plate of the invention. That element is the piezoelectric transducer 52, the vibratory means located at the center of the plate 50. The plate 50 is composed of Plexiglas in the preferred embodiment and is about 0.1 cm. thick at the center and about 0.6 cm. thick at the outside. The configuration is parabolic.

Although Plexiglas is used in the specific embodiment, it will be understood that any substance exhibiting the stress-optic effect is satisfactory for use in this invention. Many plastics are also well known stress-optic substances. The result desired in this invention is a change in the status of polarization at points at which a standing wave is induced across a substance. Any substance which exhibits the stress-optic effect when under stress and which can be molded to the desired configuration or caused to transmit pressure waves in accordance with the principles of the invention has utility in this invention.

Reference is made to FIG. 3 where the matching symmetrical concave structure of the plate 50 is illustrated. However, before proceeding with a detailed explanation of FIG. 3 the standing wave phenomenon will be discussed in detail so that the purpose and relative dimensions of the structure can be clearly understood.

Figure 4A:
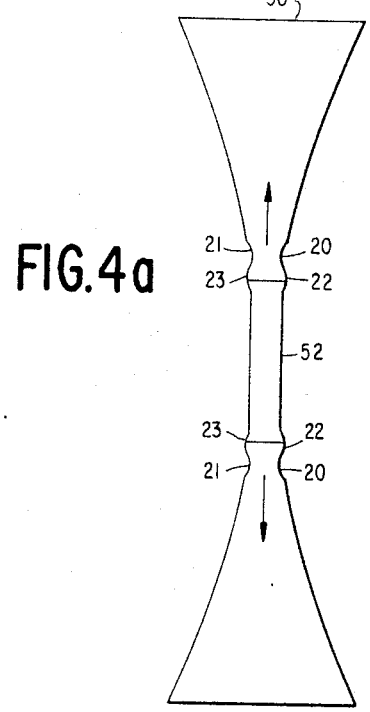
FIGS. 4a and 4b are illustrative of the standing wave phenomenon and are included for the purpose of more clearly showing the invention.
Figure 4B:
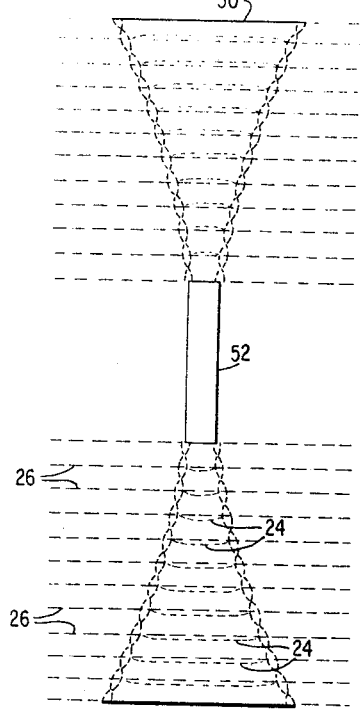

Reference is made to FIGS. 4a and 4b: in exaggerated form two compression waves 20 and 21 (FIG. 4a) proceed outward from the center of the plate 50. The compression waves are trailed by tension waves 22 and 23, caused by the elastic recoil of the plate 50. The compression waves, of course, are induced by the squeezing effect of the piezoelectric transducer 52 in response to the potentials from the variable oscillator hereinafter discussed. The phenomenon of piezoelectric movement is well-known in the art.

The speed of propagation of the compression waves 21 and 20, and of the expansion waves 22 and 23 is determined by the mechanical properties of a given system. The speed is the same speed as the propagation of a sound wave through such a system. It is not so apparent that the boundary conditions of the two shaped surfaces of the plate define the wave length of the standing stress waves. It is a fact, however, that they do since the wave propagates not only in a direction transverse to the center of the plate 50 but also at every point up to the boundaries. The wave fronts as they move are not straight lines, but are curved and, in the structure used which has a moderate slope at the sides, the waves at the side restrain somewhat the waves propagating transversely. The incident light travels perpendicular to the transverse axis and sees effective stress induced areas which are a combination of the actual stresses created. The distance between locations of the same effective stress-optic properties decreases in the direction of the diameter. A second boundary condition occurs at the outer radial edge of the plate 50 and the energy which can no longer be propagated outwardly is reflected back. Thus, when a rhythmic action is set up at the piezoelectric transducer 52 by the oscillator 17, waves propagating out from the piezoelectric transducer 52 meet waves reflected back by the outer radial boundary of the plate 50. Assuming that the dimensions are properly chosen with reference to the frequency applied to the transducer 52, standing waves are set up in the plate 50. At the null points the crystal undergoes no stress. At the peak points however the crystal is under substantial stress and, since it is a stress-optic material, the status of polarization of light passing through the crystal at the stress points will be changed. This is further illustrated in FIG. 4b. The bowed dashed lines 24 connecting standing waves at the boundaries illustrate the actual stresses induced. The horizontal dashed lines 26 illustrate how the impinging light passes as a cord across the bowed stress points and is thus acted upon by a mean value dependent upon the stress at each point on each cord.

It is well-known within the state of the molding art to form Plexiglas, stress-optic plastics, and most other stress-optic materials in the manner shown and used in the preferred embodiment. In practicing the preferred embodiment the plate 50 can be procured specially made from those in the molding art, and the cost of such materials is relatively low. Mounting of the piezoelectric transducer 52 in the center is simply a matter of drilling a hole and cementing the crystal to the center of the plate. It should be understood, however, that other means of setting up the desired standing waves in a plate are within the contemplation of this invention. In particular, various methods of heat treatment could cause the velocity of propagation of a stress wave to be different across the material in accordance with that required to create standing waves which define a diffraction pattern. The heat treatment can be a permanent annealing step done before the lens is finally constructed or it can be the heating of the material at its center or at other selected locations during focusing. The change in propagation speed would change the location of the standing waves in accordance with the above analysis and a Fresnel zone plate could be created by oscillations in the manner of the preferred embodiment.

Reference is made once again to FIG. 2, which shows the structure of the plate of the preferred embodiment. It should be clear by the analysis above that the standing waves described in connection with FIGS. 4a and 4b will exist in the section taken through the center of the plate shown in FIG. 2 and that propagation is in concentric circles (much like the waves propagated when a stone is dropped in water). Reflection occurs at the outer, radial boundary of the circular plate. The standing waves appear in concentric circles which vary in spacing from the center in accordance with the boundary conditions of the plate used in the preferred embodiment.

The specific details of design of the preferred embodiment are dictated by the Fresnel zone plate configuration which it is the purpose of this invention to create. The following discussion of Fresnel zone plate focusing is included because of the analogy between a conventional Fresnel zone plate and the zone plate created with electrical and vibratory means by the invention. Reference is made to FIG. 5 which shows, for purposes of discussion, a conventional Fresnel zone plate. Fresnel zone plate interaction is obtained by a passing radiation which will interfere in accordance with a pattern which results in an additive effect at the point of focus. FIG. 5 shows a conventional plate of this kind for purposes of discussion, in which the radiation to be excluded from interference is blocked by opaque rings.

The opaque rings 40, which are analogous to the rings defined by standing waves in the invention, defines a mask to pass only that radiation which will diffract in the desired manner. The opaque rings 40 are mounted on a flat transparent plate 42, which is analogous to the plate 50. FIG. 5 shows, for purposes of illustration, the shortest five radii of the zone plate, illustrated figuratively by the use of dashed lines, so that the manner of defining the radii will be made perfectly clear. Of course, remaining radii are numbered in accordance with the same scheme, and it will be understood that the shortest five radii are chosen only as being the most convenient for the purposes of illustration. Since the distance to the point of focus from each radius increases one-half wave length in the zone plate shown, the formula $r_n = \sqrt{nf\lambda}$ describes the dimensions of the system for purposes of calculation, where $r_n$ is the radius of the $n$th zone, $f$ is the distance to the focal point from the zone plate surface, and $\lambda$ is the wave length of the light to be focused. The following tables and analyses describe focusing at 10 to 200 centimeters, and with light of 5000 angstroms.

TABLE I.—WAVE LENGTH OF STRESS WAVES FOR THE FIRST ZONE CALCULATED FOR PLEXIGLAS AND SUPPLY FREQUENCY TO THE PIEZO-OPTIC TRANSDUCER
[Light wave length, $\lambda$=5000 A., sound velocity in Plexiglas, $v$=1500 m./s.]

| Focal Length (cm.) | Stress Wave Length (mm.) | Supply Frequency (mc./s.) |
|---|---|---|
| 10 | 0.2 | 8.5 |
| 20 | 0.27 | 6.3 |
| 30 | 0.324 | 5.25 |
| 40 | 0.36 | 4.72 |
| 50 | 0.414 | 4.1 |
| 60 | 0.44 | 3.86 |
| 80 | 0.53 | 3.2 |
| 100 | 0.6 | 2.83 |
| 200 | 0.82 | 2.07 |

The size and shape of the stress-optic plate depends on the required focal length and range and on the required number of zones.

The formula $r_n = \sqrt{nf\lambda}$ indicates that, when $f$ and $\lambda$ are constant, the zone radii increase in a parabolic fashion. The plate in the preferred embodiment is therefore fashioned as two concave parabolas, symmetrically disposed opposite each other as shown in FIG. 3. This design assumes that each standing wave appears the same lateral distance out from the center of the plate. This assumption is only approximately true, but the errors are negligible at locations displaced from the center of the parabola. Furthermore, the center of the parabola is obscured by the transducer.

In the preferred embodiments of a stress-optic Fresnel lens it is desired to change the focal length in the range between 40 cm. and 60 cm. The number of zones for the focal length $f=50$ cm. is selected as $n=5000$ to obtain a large amount of power at the point of focus. This establishes the outer diameter of the stress-optic plate at 7.08 cm. in accordance with the formula $r_n = \sqrt{nf\lambda}$. This establishes $r_n$ for other points of focus. It follows that for $f=40$ cm. the number $n=6250$ and for $f=60$ cm. is $n=4160$. The diameter of the piezoelectric transducer is 0.4 cm. to eliminate inaccuracies in the assumed formulas at the center of the lens by simply obscuring the center. The thickness of the transducer is 0.1 cm. Starting with this diameter and with the parabolic shape which is selected, stress waves were analyzed to find that the thickness at the top should be approximately 0.6 cm. Table II shows the results of the final design.

TABLE III

| Wave Length of Light (A.) | Focal Length [1] (cm.) | Focal Range For Supply Frequency Ranges of Table II (in cm.) | |
|---|---|---|---|
| | | From | To |
| 2,000 | 125 | 100 | 150 |
| 4,000 | 62.5 | 50 | 75 |
| 5,000 | 50 | 40 | 60 |
| 6,000 | 41.7 | 33.3 | 50 |
| 10,000 | 25 | 20 | 30 |
| 20,000 | 12.5 | 10 | 15 |
| 30,000 | 8.3 | 6.6 | 10 |
| 40,000 | 6.2 | 5 | 7.5 |
| 50,000 | 5 | 4 | 6 |

[1] Focal length at center of 5,000 angstroms range.

Thus, in the preferred embodiment the plate 50 was 0.1 cm. thick at the center and the bi-convex parabolic sides sloped evenly to the outer edge, which was 0.6 cm. thick. For focusing at 50 cm. the frequency of oscillations by the oscillator 17 was 12.5 megacycles per second. To change focus to 60 cm., the frequency of oscillation by the oscillator 17 was simply changed to 9.87 megacycles per second.

For an understanding of the entire system reference is made to FIG. 3. A source of collimated, monochromatic light 13 is shown at the left, emitting light 14. The light is linearly polarized in the polarizer 15, which may be any of the many polarizers known in the art. The light then impinges perpendicular to the radius of the plate 50. After emerging from the plate 50 the light passes through an analyzer 16, which may be any of the well known devices in the art to pass radiation of only one polarity. The point of focus $f$ is shown figuratively on the right of FIG. 3. In the preferred embodiment the refractions of the concave plate 50 cause a spread of the beam since the plate 50 acts as any conventional shaped lens. This must be compensated for. Therefore, convex lens 18 is in the optical path and has such focusing properties as to negate the undesired spreading of the plate 50. Oscillations are induced in the piezoelectric transducer 52 by the variable oscillator 17. Operation of the preferred embodiment is as follows: When no standing waves are induced on the plate 50, the light emerging from the plate is the same relatively wide expanse of light which impinges upon the plate and all of the light is of the same polarity. The simple lens action of the plate 50 is compensated by the lens 18 as mentioned above. Fresnel zone plate action does not occur since a Fresnel zone plate is not defined in any manner. When the standing waves are induced into the plate the status of polarization of light emerging from those locations on the plate in which stresses are induced is changed. The light 14 is, of course, so oriented with respect to the plate 1 that change in the status of polarization of light emerging from the stress-induced areas occurs.

TABLE II

| Focal Length (cm.) | Number of Zones | First Zone Number (others obscured by transducer) | Approximate Supply Frequency (mc./s.) | Approximate Thickness of Plate | |
|---|---|---|---|---|---|
| | | | | Center (cm.) | Outer (cm.) |
| 40 | 6,250 | 20 | 15.0 | 0.1 | 0.6 |
| 50 | 5,000 | 16 | 12.5 | 0.1 | 0.6 |
| 60 | 4,160 | 13 | 9.87 | 0.1 | 0.6 |

Focusing takes place as a result of orthogonal polarization of light transmitted and the fact that the pattern of the polarized light is in a Fresnel zone plate configuration. Light emerging from the stressed points as components orthogonal to the other emerging light. Since orthogonal light does not interfere, diffraction in accordance with its pattern occurs. The Fresnel zone plate pattern results in diffraction to the point of focus $f$. The analyzer 16 passes radiation of the polarity induced by the stress-optic substance when under stress, but excludes radiation of an other polarization, which is not being focused, to insure the exclusion of undesired radiation. Adjusting the frequency of oscillations and thus the locations of the standing waves creates a different Fresnel pattern and thus causes focusing at a different point. Such adjustment can be effected at relatively high speed by simply varying the oscillations of the oscillator 17.

The operation of the device in the specific example of FIG. 1, chosen for purposes of illustration, is as follows. The oscillator 7 is the timing oscillator (or clock) of a data processing system. Proper timing is critical to assure that data is transferred within the system without becoming mingled with other data. A visual indication must appear on the control panel of the data processing system to indicate when timing has drifted or otherwise changed to unsatisfactory or potentially unsuitable speeds, and such a checking system is provided by the system shown in FIG. 1. Discrete signals are to appear at the control panel of the data processing system. Line 3, for example, will carry a signal and light a bulb at the control panel of the data processing system when the oscillator 7 is at too high a speed, but not so high a speed as to render the timing completely unsuitable. Line 3 will be activated by focusing the light beam 8 on the photodiode 6 in response to a frequency within a predetermined range. In the same manner, line 4 is activated by focusing the light beam 8 on diode 5 and then will carry a discrete signal to a different light bulb on the control panel when the frequency is somewhat too low. Line 1 will be activated by diode 4 when the frequency is completely unsuitable in the low direction. Any number of discrete indications could appear on output lines (not shown) identical in function to lines 1, 2, and 3 by focusing on photodiodes (not shown) located at different focal lengths from the lens 10.

The oscillator 7, in addition to controlling the timing of the aforementioned data processing system, also generates frequencies which create mechanical vibrations in the stress-optic lens 10. The photodiode 6 is at one distance from the lens 10, while photodiode 5 is at a further distance, and photodiode 4 is at a still greater distance. The mechanical vibrations caused by the oscillator 7 establish standing waves at certain locations on the plate. The standing waves define a Fresnel zone plate so as to focus the light beam 8 passing through the lens 10 at certain spaced focal points which bear a relation to the frequency of the oscillator. If the photodiodes 4, 5, and 6 are positioned at the different spaced focus points, they will be activated. Therefore, if photodiode 4 is located at the point of focus related to the one frequency created by the oscillator 7, the light bulb associated with it will indicate that the frequency is completely unsuitable in the low direction. At a different, higher frequency, the light beam 8 will be focused on and activate photodiode 6, and line 3 thus completes a different circuit to a different indication bulb on the control panel of the data processing system. The same will be true with diode 5, which is activated in the same manner.

While the invention has been particularly shown and described with reference to a preferred embodiment thereof, it will be understood by those skilled in the art that the foregoing and other changes in form and details may be made therein without departing from the spirit and scope of the invention.

I claim:
1. An adjustable focusing system comprising:
   a source of collimated, high frequency electromagnetic radiation,
   a stress-optic plate which will change the status of polarization of said radiation passing through it when under stress, having mechanical wave propagation characteristics suitable to produce standing waves,
   means to induce mechanical vibrations in said plate, said mechanical vibrations being induced at a predetermined area so located that substantially concentric standing waves are induced in said plate at locations which define one Fresnel zone plate to said radiation,
   means to vary the frequency of said mechanical vibration to define a second Fresnel zone plate to said radiation which causes focusing at a point different from said first Fresnel zone plate.

2. The device according to claim 1 wherein said stress-optic plate is circular and said means to induce mechanical vibration induces vibrations in the center of said plate.

3. The device according to claim 2 wherein said stress-optic plate is concave on at least one side sloped so that standing waves are produced in substantially Fresnel zone plate configurations.

4. The device according to claim 3 wherein said source of radiation produces linearly polarized radiation within the wave length range of 2,000 angstroms to 50,000 angstroms and also including an analyzer situated in the optical path beyond said stress-optic plate oriented to pass radiation of polarization induced by said stress-optic plate when under stress.

5. The device according to claim 2 wherein said stress-optic plate has substantially flat large areas which are heat treated at selected locations so that the speed of propagation of a compression wave in said plate varies so that standing waves set up in said plate substantially define Fresnel zone plate configurations.

6. The device according to claim 5 wherein said source of radiation produces linearly polarized radiation within the wave length range of 2,000 angstroms to 50,000 angstroms and also including an analyzer located in the optical path beyond said stress-optic plate oriented to pass radiation of polarization induced by said stress-optic plate when under stress.

7. The device according to claim 1 wherein said source of radiation produces radiation in the wave length range of 2,000 angstroms to 50,000 angstroms.

8. A variable system to diffract high frequency radiation to a point comprising:
   a source of collimated high frequency electromagnetic radiation,
   a stress-optic material which will change the status of polarization of said radiation passing through it when under stress and formed such that it has mechanical wave propagation characteristics when mechanically vibrated at a given area which produce substantially concentric standing waves at locations which describe a pattern to said radiation which will diffract most of said radiation to a point,
   means to induce mechanical vibrations at said given area,
   means to vary the frequency of said mechanical vibrations so that a focusing at a second point is obtained.

9. The device according to claim 8 wherein said form of said stress-optic material is circular, and said means to induce mechanical vibrations induces vibrations in the center of said configuration.

10. The device according to claim 9 wherein said conformation of said stress-optic material is concave on at least one side and increases in thickness with respect to radial dimension to form a conformation in which standing waves are produced in substantially concentric circular patterns which will diffract said radiation to a point.

11. The device according to claim 10 wherein said source of radiation produces linearly polarized radiation within the frequency range 2,000 angstroms to 50,000 angstroms and also including an analyzer situated in the optical path beyond said stress-optic material oriented to pass radiation of polarization induced by said stress-optic material when under stress.

12. The device according to claim 9 wherein said conformation of said stress-optic material is substantially flat in thickness and said stress-optic material is heat treated at selected locations so that the speed of propagation of a compression wave in said material varies so that standing waves are set up in said stress-optic material in concentric circles which define a pattern which will diffract light to a point.

13. The device according to claim 12 wherein said source of radiation produces linearly polarized radiation within the frequency range of 2,000 angstroms to 50,000 angstroms and also including an analyzer located in the optical path beyond said stress-optic material oriented to pass radiation of polarization induced by said stress-optic material when under stress.

14. The device according to claim 8 wherein said source of radiation produces radiation frequency range of 2,000 angstroms to 50,000 angstroms.

References Cited by the Examiner

UNITED STATES PATENTS 3,227,034   1/1966   Shelton _____ 88—61 X

OTHER REFERENCES

Heidemann et al.: "Secondary Interference in the Fresnel Zone of Gratings", Journal of the Optical Society of America, vol. 49, No. 4, April 1959, pp. 372–375.

JEWELL H. PEDERSEN, *Primary Examiner.*

JOHN K. CORBIN, *Examiner.*